United States Patent
Sommer et al.

(10) Patent No.: US 12,176,514 B2
(45) Date of Patent: Dec. 24, 2024

(54) PROCESS FOR MAKING AN ELECTRODE ACTIVE MATERIAL

(71) Applicant: BASF SE, Ludwigshafen am Rhein (DE)

(72) Inventors: Heino Sommer, Ludwigshafen (DE); Carsten Sueling, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 504 days.

(21) Appl. No.: 17/595,337

(22) PCT Filed: Jan. 12, 2021

(86) PCT No.: PCT/EP2021/051314
§ 371 (c)(1),
(2) Date: Nov. 15, 2021

(87) PCT Pub. No.: WO2021/151772
PCT Pub. Date: Aug. 5, 2021

(65) Prior Publication Data
US 2022/0216456 A1    Jul. 7, 2022

(30) Foreign Application Priority Data
Jan. 28, 2020 (EP) .................... 20154166

(51) Int. Cl.
*H01M 4/04* (2006.01)
*C01G 53/00* (2006.01)
*H01M 4/525* (2010.01)
*H01M 4/62* (2006.01)

(52) U.S. Cl.
CPC .......... *H01M 4/0471* (2013.01); *C01G 53/44* (2013.01); *H01M 4/525* (2013.01); *H01M 4/622* (2013.01); *H01M 4/625* (2013.01); *C01P 2004/61* (2013.01); *C01P 2006/11* (2013.01); *C01P 2006/12* (2013.01); *C01P 2006/40* (2013.01); *C01P 2006/82* (2013.01)

(58) Field of Classification Search
CPC .............. C01P 2004/61; C01P 2006/11; C01P 2006/12; C01P 2006/40; C01P 2006/82; C01P 2004/51; C01P 2006/80; C01P 2006/10; H01M 4/0471; H01M 4/525; H01M 4/622; H01M 4/625; H01M 4/04; H01M 4/0404; G01N 27/26; G01N 27/30; Y02E 60/10; C01G 53/44; C01G 53/006; B25J 9/0084; B25J 11/00
See application file for complete search history.

(56) References Cited

U.S. PATENT DOCUMENTS

2018/0090759 A1*    3/2018  Suzuki ................ H01M 4/1391

FOREIGN PATENT DOCUMENTS

| CN | 108 123 100 A | 6/2018 | |
| CN | 108123100 * | 6/2018 | .......... H01M 10/058 |
| EP | 3 093 272 A1 | 11/2016 | |
| EP | 3093272 * | 11/2016 | ............. C01G 53/00 |
| JP | 10 289729 A | 10/1998 | |

OTHER PUBLICATIONS

English translation of CN108123100.*
International Seach Report dated Mar. 29, 2021, PCT/EP2021/051314.

* cited by examiner

*Primary Examiner* — Kiran Quraishi Akhtar
(74) *Attorney, Agent, or Firm* — Armstrong Teasdale LLP

(57) ABSTRACT

Disclosed herein is a process for making an electrode active material, including: (a) forming a mixture, (b) transferring the mixture into saggars, crucibles or open cups, (c) calcining the mixture at a temperature in the range of from 700 to 1000° C., (d) cooling down the resultant electrode active material, (e) applying a robot to take at least two samples of 10 mg to 10 g of every saggar, crucible or open cup to be analyzed, or per defined period of time, respectively, (f) transferring the samples to another robot or to another part of the same robot, where the robot makes an electrode material mix from samples of the same saggar, crucible or open cup, and (g) transferring the electrode material mix to a test unit to perform electrochemical tests, where the robot performs steps (f) to (g) with several samples in parallel.

9 Claims, No Drawings

PROCESS FOR MAKING AN ELECTRODE ACTIVE MATERIAL

CROSS-REFERENCE TO RELATED APPLICATIONS

This application is a U.S. national stage entry application under 35 U.S.C. § 371 from International Application No. PCT/EP2021/051314, filed on Jan. 21, 2021, which claims priority to E.P. patent application No. 20154166.1 filed on Jan. 28, 2020; the contents of each application is incorporated herein by reference in its entirety.

BACKGROUND OF THE INVENTION

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Cathode active materials are generally manufactured by using a two-stage process. In a first stage, a sparingly soluble compound of the transition metal(s) is made by precipitating it from a solution, for example a carbonate or a hydroxide. Said sparingly soluble salts are in many cases also referred to as precursors. In a second stage, a precursor is mixed with a lithium compound, for example $Li_2CO_3$, LiOH or $Li_2O$, and calcined at high temperatures, for example at 600 to 1100° C.

Several technical fields are still to be solved. Volumetric energy density, capacity fade, cycling stability are still fields of research and development. However, in production additional problems have been detected. Although a constant product quality is desired sometimes the quality and the composition varies in broad ranges. Strong variation of quality, however, may lead to higher amounts of product not meeting the specification, hereinafter also referred to as "off-spec" material, and to a cost increase.

It was therefore an objective to provide a process that leads to a more homogeneous product quality in the manufacture of electrode active materials and to a reduced amount of off-spec material.

BRIEF SUMMARY OF THE INVENTION

The present invention is directed towards a process for making an electrode active material, said process comprising the steps of:
(a) mixing a composite oxide, (oxy) hydroxide, hydroxide or carbonate of nickel and at least one of cobalt and manganese and, optionally, at least one of Mg, Al and Y or a transition metal selected from Ti, Zr, Nb, Ta, Fe, Mo, and W, with at least one source of lithium selected from lithium carbonate, lithium oxide and lithium hydroxide and, optionally, with at least one dopant selected from oxides, hydroxides and oxyhydroxides of Mg, Al, Y, Ti, Zr, Nb, Ta, Fe, Mo, and W, and from fluorides,
(b) optionally, transferring said mixture into saggars, crucibles or open cups,
(c) calcining said mixture in a pusher kiln or roller hearth kiln or rotary kiln at a temperature in the range of from 700 to 1000° C.,
(d) cooling down the resultant electrode active material,
(e) applying a robot to take at least two samples of 10 mg to 10 g per of every saggar, crucible or open cup to be analyzed, or per defined period of time, respectively,
(f) transferring said samples to another robot or to another part of the same robot, where the robot makes an electrode material mix from samples of the same saggar, crucible or open cup, and
(g) transferring the electrode material mix to a test unit to perform electrochemical tests, wherein the robot performs steps (f) to (g) with several samples in parallel.

DETAILED DESCRIPTION OF THE INVENTION

Accordingly, the process defined at the outset has been found, hereinafter also referred to as "inventive process" or as "process according to the (present) invention". The inventive process comprises a sequence of several steps as defined at the outset, hereinafter also defined as step (a), step (b), step (c) etc. The inventive process will be described in more detail below. Step (b) is an optional step.

By performing the inventive process, an electrode active material is made. Said electrode active material may be described by the general formula $Li_{1+x}TM_{1-x}O_2$ with TM containing nickel and at least one of cobalt and manganese and, optionally, at least one of Mg, Al and Y or a transition metal selected from Ti, Zr, Nb, Ta, Fe, Mo, and W. In embodiments wherein the majority of TM is manganese, x is preferably in the range of from zero to 0.3. In embodiments wherein the molar amount of nickel is at least the same or higher than the molar amount of manganese, x is preferably in the range of from −0.02 to 0.15.

Step (a) includes mixing a precursor selected from composite oxides, composite (oxy) hydroxides, composite hydroxides and composite carbonates of nickel and at least one of cobalt and manganese and, optionally, at least one of Mg, Al and Y or a transition metal selected from Ti, Zr, Nb, Ta, Fe, Mo, and W, with at least one source of lithium selected from lithium carbonate, lithium oxide and lithium hydroxide, and, optionally, with at least one dopant selected from oxides, hydroxides and oxyhydroxides of Mg, Al, Y, Ti, Zr, Nb, Ta, Fe, Mo, and W, and from fluorides. The term lithium hydroxide includes LiOH and hydrates of LiOH, e.g., LiOH·$H_2O$. The stoichiometry of precursor and source of lithium is selected in accordance with the desired electrode active material.

Said precursor is preferably obtained by co-precipitating nickel, cobalt and manganese as hydroxides from an aqueous solution containing nitrates, acetates or preferably sulfates of nickel, cobalt and manganese in a stoichiometric ratio corresponding to TM. Said co-precipitation may be accomplished by the addition of alkali metal hydroxide, for example potassium hydroxide or sodium hydroxide, in a continuous, semi-continuous or batch process. Said co-precipitation is then followed by removal of the mother liquor, for example by filtration, and subsequent removal of water.

Said precursor is in particulate form. In one embodiment of the present invention, the mean particle diameter (D50) of such precursor is in the range of from 4 to 16 μm, preferably 7 to 10 μm. The mean particle diameter (D50) in the context of the present invention refers to the median of the volume-based particle diameter, as can be determined, for example, by light scattering. In one embodiment, the precursor has a monomodal particle diameter distribution. In other embodiments, the particle distribution of the precursor may be bimodal, for example with one maximum in the range of from 1 to 5 μm and a further maximum in the range of from 7 to 16 μm.

The particle shape of the secondary particles of said precursor is preferably spheroidal, that are particles that have a spherical shape. Spherical spheroidal shall include not just those which are exactly spherical but also those particles in which the maximum and minimum diameter of at least 90% (number average) of a representative sample differ by not more than 10%.

In one embodiment of the present invention, said precursor is comprised of secondary particles that are agglomerates of primary particles. Preferably, said precursor is comprised of spherical secondary particles that are agglomerates of primary particles. Even more preferably, said precursor is comprised of spherical secondary particles that are agglomerates of spherical primary particles or platelets.

In one embodiment of the present invention, said precursor may have a particle diameter distribution span in the range of from 0.5 to 0.9, the span being defined as [(D90)-(D10)] divided by (D50), all being determined by LASER analysis. In another embodiment of the present invention, said precursor may have a particle diameter distribution span in the range of from 1.1 to 1.8.

In one embodiment of the present invention the specific surface (BET) of said precursor is in the range of from 2 to 10 m$^2$/g or even 15 to 100 m$^2$/g, determined by nitrogen adsorption, for example in accordance with to DIN-ISO 9277:2003-05.

In one embodiment of the present invention said precursor may have a homogeneous distribution of the transition metals nickel, cobalt and manganese over the diameter of the particles. In other embodiments of the present invention, the distribution of at least two of nickel, cobalt and manganese is non-homogeneous, for example exhibiting a gradient of nickel and manganese, or showing layers of different concentrations of at least two of nickel, cobalt and manganese. It is preferred that said precursor has a homogeneous distribution of the transition metals over the diameter of particles.

In one embodiment of the present invention, said precursor may contain elements other than nickel and at least one of cobalt and manganese, for example at least one of Mg, Al and Y or a transition metal selected from Ti, Zr, Nb, Ta, Fe, Mo, and W, for example in amounts of 0.1 to 5% by mole, referring to TM. However, it is preferred that said precursor only contains negligible amounts of elements other nickel, cobalt and manganese, for example detection level up to 0.05% by mole.

Said precursor may contain traces of metal ions, for example traces of ubiquitous metals such as sodium, calcium, iron or zinc, as impurities but such traces will not be taken into account in the description of the present invention. Traces in this context will mean amounts of 0.05 mol-% or less, referring to the total metal content of TM.

In one embodiment of the present invention, said precursor contains one or more impurities such as residual sulphate in case such precursor has been made by co-precipitation from a solution of one or more sulphates of nickel, cobalt and manganese. The sulphate may be in the range of from 0.1 to 0.4% by weight, referring to the entire precursor.

In one embodiment of the present invention, said precursor is an oxide, oxyhydroxide or hydroxide of TM, with TM being of the general formula (I)

$$(Ni_aCo_bMn_c)_{1-d}M_d \qquad (I)$$

with
a being in the range of from 0.6 to 0.90, preferably 0.6 to 0.7,
b being in the range of from 0.05 to 0.2, preferably 0.1 to 0.2,
c being in the range of from 0.05 to 0.2, preferably 0.1 to 0.2, and
d being in the range of from zero to 0.1, preferably from 0.005 to 0.1,
and M is Al, Ti, Zr, or a combination of at least two of the foregoing, and $$a+b+c=1.$$

Optionally, at least one dopant selected from oxides, hydroxides and oxyhydroxides of Mg, Al, Y, Ti, Zr, Nb, Ta, Fe, Mo, and W may be added to said precursor and to the source of lithium.

Mixing of precursor and source of lithium and, optionally, dopant(s) may be performed all in one step or in several sub-steps, for example by first mixing source of lithium and dopant and adding such mixture to precursor, or by first mixing precursor and source of lithium and, if desired, then adding dopant(s), or by first mixing dopant(s) and precursor and then adding source of lithium. It is preferred to first mix precursor and source of lithium and to then add dopant(s).

In step (a), a mixture is obtained.

In the—optional—step (b) the mixture obtained from step (a) is transferred into saggars, crucibles or open cups. The loading of saggars, crucibles or open cups may be selected in wide ranges, for example 4 to 15 kg. Preferably, the loading is in the range of from. In embodiments wherein step (c) is carried out in a rotary kiln, step (b) is obsolete.

Step (c) includes calcining said mixture in a pusher kiln or roller hearth kiln or rotary kiln at a temperature in the range of from 700 to 1000° C.

In one embodiment of the present invention, the mixture of precursor and source of lithium and, optionally, dopant(s), is heated to 700 to 1000° C. with a heating rate of 0.1 to 10 K/min.

In one embodiment of the present invention, the temperature in step (c) is ramped up before reaching the desired temperature of from 700 to 1000° C., preferably 750 to 900° C. For example, first the mixture of precursor and source of lithium and, optionally, dopant(s) is heated to a temperature to 350 to 550° C. and then held constant for a time of 10 min to 4 hours, and then it is raised to 700° C. up to 1000° C.

In one embodiment of the present invention, step (c) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily.

In one embodiment of the present invention, step (c) is performed in an oxygen-containing atmosphere, for example in a nitrogen-air mixture, in a rare gas-oxygen mixture, in air, in oxygen or in oxygen-enriched air. In a preferred embodiment, the atmosphere in step (c) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen.

In one embodiment of the present invention, step (c) of the present invention is performed under a stream of gas, for example air, oxygen and oxygen-enriched air. Such stream of gas may be termed a forced gas flow. Such stream of gas may have a specific flow rate in the range of from 0.5 to 15 m$^3$/h·kg material according to general formula $Li_{1+x}TM_{1-x}O_2$. The volume is determined under normal conditions: 298 Kelvin and 1 atmosphere. Said stream of gas is useful for removal of gaseous cleavage products such as water and carbon dioxide.

The inventive process may include further steps such as, but not limited, additional calcination steps at a temperature in the range of from 500 to 1000° C. subsequently to step (c).

In one embodiment of the present invention, step (c) has a duration in the range of from one hour to 30 hours. Preferred are 5 to 12 hours.

Preferably, the electrode active materials obtained from step (c) have a surface (BET) in the range of from 0.1 to 0.8 m$^2$/g, determined according to DIN-ISO 9277:2003-05.

After calcination in accordance to step (c), the electrode active material so obtained is cooled down before further processing, step (d). Step (d) may be performed by exposing the freshly manufactured electrode active material to ambient temperature. In embodiments wherein step (c) is performed in a rotary hearth kiln or a pusher kiln, the freshly manufactured electrode active material is left in the respective saggars, crucibles or open cups during step (d).

In one embodiment of the present invention, the average cooling rate is in the range of from 1 to 3 K/min.

In one embodiment of the present invention, step (d) is performed to a maximum temperature of 150° C., preferably to a maximum temperature of 120° C., even more preferably is a temperature region from 60 to 120° C. The maximum temperature refers to the temperature of the freshly manufactured electrode active material, measured after the saggars have left the kiln. If the temperature is higher, the robot employed in subsequent step (e) may be damaged.

In an optional step, and after step (d), the freshly manufactured electrode active material may be deagglomerated, for example in a mill, e.g., an air classifier mill. For laboratory scale experiments, sieve stacks are feasible as well.

For performing step (e), a robot is applied. Said robot takes at least two samples of from 10 mg to 10 g, preferably 20 mg to 5 g and even more preferably 100 mg to 2 g per saggar, crucible or open cup to be analyzed, or per defined period of time, respectively. Said samples are withdrawn from different locations of the respective saggar, crucible or open cup to ensure that not only material from the surface but also from the inner part of the loading of such saggar, crucible or open cup is analyzed. In embodiments wherein a rotary kiln is used in step (c), such samples are taken per defined period of time, for example every two hours or every 5 hours.

In one embodiment of the present invention, the robot takes 2 to 10 samples per saggar, crucible or open cup to be analyzed, or per defined period of time, respectively, preferably 3 to 5. The more samples are taken the more it is ensured that the samples provide a representative average of the overall loading. However, if too many samples are taken too much electrode material is spent for analyses.

In a preferred embodiment, the samples taken from the same saggar, crucible or open cup are combined and intimately mixed by the robot before further analysis.

Although it is possible to have the robot take samples from each saggar, crucible or open cup, respectively, it is preferred to not analyze each and every saggar, crucible or open cup. For example, in many embodiments it is sufficient to have the robot take samples from one out of every 5 to 12 saggars, crucible or open cup per production run. In particular, when certain trends in synthesis performance are tracked, such a number of samples is generally sufficient. In other embodiments, for example in embodiments where step (c) is carried out in a rotary kiln, it is preferred to have the robot take samples after a certain time period, for example every 20 minutes up to every 12 hours, or preferably every 30 minutes up to every 6 hours.

The robot may assign numbers to the combined samples taken from each saggar, crucible or open cup to be analyzed and may then combine such number with the respective number of the saggar, crucible or open cup, respectively, to enable tracing a sample with a saggar, crucible or open cup.

In other embodiments, no numbers are assigned to saggars, crucibles or open cups, and simply a trend of results in steps (f) or (g) is determined. If said trend shows that the samples miss the specification, the robot reacts as characterized below.

The robot can take the samples with a robotic arm that holds device such as a spatula, a spoon-shaped instrument or the like for taking said samples.

In step (f), the robot transfers the samples to another robot or to another part of itself where the respective robot makes an electrode material mix from electrode material samples of the same saggar, crucible or open cup. In the context of the present invention and unless specifically indicated otherwise, there will not be made any distinction between the "another part" of the same robot that withdraws samples from of the same saggar, crucible or open cup, and second and thus different robot that carries out the analyses.

Said electrode material mix is preferably as similar as an electrode material mix that is used for making a commercial-type electrode. Commercial-type electrode mixes usually contain electrode active material, a conductive carbon, and a binder polymer that are slurried in water or a non-protic organic solvent. Preferred organic non-protic solvent is N-methyl pyrrolidone ("NMP").

Suitable binder polymers are preferably selected from organic (co)polymers, preferably those without ionic groups. Suitable organic (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also of maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have an average molecular weight $M_w$ in the range from 50,000 to 1,000,000 g/mol, preferably to 500,000 g/mol.

Binder may be cross-linked or non-cross-linked (co)polymers.

In a particularly preferred embodiment of the present invention, binder polymers are selected from halogenated (co)polymers, especially from fluorinated (co)polymers. Halogenated or fluorinated (co)polymers are understood to mean those (co)polymers which comprise at least one (co) polymerized (co) monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binder polymers are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Conductive carbon may be selected from soot, active carbon, carbon nanotubes, graphene, and graphite.

Preferably, step (f) includes mixing the electrode active material with conductive carbon, a binder polymer and NMP, even more preferably, with binder polymer and NMP and a combination of graphite and a conductive carbon other than graphite, for example, soot.

In one embodiment of the present invention, the quantities employed in step (f) are based on 10 mg to 10 g electrode active material, preferably 100 mg to 2 g.

In one embodiment of the present invention,
(A) 80 to 96% by weight electrode active material,
(B) 2 to 18% by weight of carbon,
(C) 2 to 10% by weight of binder polymer, In one embodiment of the present invention, a maximum of 12 m$^1$ solvent is used per sample of electrode active material, for example 2 to 15 m$^1$.

In one embodiment of the present invention, step (f) is performed in a forming die with many recesses arranged in rows, or in wells of a microtiter plate. "Many" in this context is preferably in the range of from 3 to 20, preferably 5 to 12.

An electrode material mix is obtained from step (f). Said electrode mix is applied to a current collector, for example in step (f) or in step (g). Said current collector is preferably made from aluminum, for example from aluminum foil in dimensions compatible with the test unit used in step (g).

In one embodiment of the present invention, electrode material mix is applied to current collectors with the help of an electronic pipette or an overhead gravimetric dispersing unit.

In one embodiment of the present invention, said application includes evaporation of the solvent, especially of the NMP, followed by pressing the raw electrode with a heated stamp or running the raw electrode through a calender.

In one embodiment of the present invention, each electrode material mix is applied to at least two current collectors in order to determine average values for electrochemical tests, for example to 2 to 5 current collectors. In other embodiments, each electrode material mix is applied to only one current collector.

In one embodiment of the present invention, an amount of 5 to 20 mg of electrode active material is applied to each electrode. In coin-type cells, the average diameter may be in the range of from 5 to 20 mm.

Overall, the robot performs steps (f) to (g) with several samples in parallel, for example, 2 to 12 samples.

In step (g), the respective robot transfers the electrode material mix—as such or already applied to a current collector—to a test unit to perform electrochemical tests, especially the 1$^{st}$ discharge in mA·h/g, and the efficiency in %.

In one embodiment of the present invention, step (g) includes the sub-steps of
(g1) placing each electrode material mix on a current collector,
(g2) removing any volatile material from the electrode material mix on said current collectors, thereby obtaining cathodes,
(g3) attaching the cathodes so obtained to separators that are each combined with an anode and with an electrolyte, thereby obtaining coin-type cells,
(g4) performing electrochemical tests with the coin-type cells from (g3).

Said sub-steps are performed by a robot.

Alternatively, steps (g1) and (g2) may be performed in the context with step (f).

In sub-step (g1), each electrode material mix is placed on a current collector. current collectors are described above, followed by removal of any volatile material from the electrode material mix on said current collectors, sub-step (g2), for example by evaporation of solvent or drying. in an optional sub-step, Sub-step (g3) includes attaching the cathodes so obtained to separators that are each combined with an anode and with an electrolyte, thereby obtaining coin-type cells. Examples of suitable anodes are graphite anodes and lithium metal anodes. Sub-step (g4) performing electrochemical tests with the coin-type cells from (g3), preferably in an electrochemical test-unit. Suitable tests are capacity fading upon repeated cycling and initial capacity tests as well as.

The test unit preferably comprises a counter anode made from by which anodes and cathodes are mechanically separated. Suitable separators are polymer films, in particular porous polymer films, and are thus unreactive toward metallic lithium. Particularly suitable materials for separators are polyolefins, in particular film-forming porous polyethylene and film-forming porous polypropylene. Separators composed of polyolefin, in particular polyethylene or polypropylene, can have a porosity in the range from 35 to 45%. Suitable pore diameters are, for example, in the range from 30 to 500 nm.

Suitable electrolytes for lithium ion batteries are known per se. Examples are solutions of a lithium salt in a non-protic organic solvent. Said lithium salt may be selected from $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$. Examples of suitable solvents are organic carbonates, with preference given to a mixture of diethyl carbonate and methyl ethyl carbonate, and mixtures of at least one of the foregoing with at least one cyclic organic carbonate.

In one embodiment of the present invention, the test unit comprises several coin cell-type electrochemical cells that are arranged in rows, for example like wells in a microtiter plate. Said coin-cell-type electrochemical cells are opened and closed by the robot, and said opening and closing is controlled by a software in the robot.

In one embodiment of the present invention, upon opening of said robot, the electrode with which the previous test was carried out, is removed from the test unit mechanically, and a freshly formed electrode is placed on the separator mechanically.

In one embodiment of the present invention, the entire documentation of steps (e) to (g) is performed by a computer, and the results of electrochemical tests are compared to the desired results by a computer. In a preferred embodiment, said processing device collects data as input through an input channel, and then said processor provides an electronic signal through an output channel to a production control function in case at least two consecutive samples show a negative deviation from the desired results. In this context, a negative deviation may refer to too low an initial capacity, too high an impedance build-up, or too high a capacity fade after repeated cycling, or too low a first discharge capacity, each by at least of 1 to 5% deviation. Said production control function may be a computer that alone or with human support supervises the production process. With the help of the signal, said production control function may then adjust any of steps (b) or (c), for example, adjust the temperature or the duration of the calcination step (c).

In an optional step (h), performed, e.g., in parallel to step (f), the respective robot may distribute samples to at least one analysis unit other than the one used in step (g), for example, X-ray diffraction ("XRD"), scanning electron microscopy ("SEM"), titration with acid for residual base determination, or inductively coupled plasma-emission spectroscopy ("ICP-OES").

In one embodiment of the present invention, the entire documentation of step(s) (h) is performed by a processing device, and the results of electrochemical tests are compared to the desired results by a processing device. In this context, "desired results" refers to the specified properties of the respective electrode active material such as, but not limited to initial capacity or efficiency. In a preferred embodiment, said processing device sends an electronic signal to a production control function in case at least two consecutive samples show a negative deviation from the desired results. In this context, a negative deviation may mean too high an acid consumption and thus too high a residual lithium content, or too strong a deviation of any of the metals, each by at least 1 to 5% of the specified value, preferably at least 1 to 2% in case of electrochemical data and even up to 5% with respect to BET surface, if applicable.

In an—optional step—(i), an after-treatment may be performed after step (c) and before or after steps (e) to (g). Examples of optional steps (i) are coating steps such as, but not limited to processes as disclosed in WO 2019/154701 and WO 2019/154702, or water treatment such as in EP 3 024 068, or a coating with fluoride. Examples of fluorides are LiF, $NH_4F$, and $(NH_4)F \cdot HF$.

By performing the inventive process electrode active materials with excellent properties are available through a straightforward and stable process. Production runs can be monitored very efficiently, and the amount of off-spec material is reduced. In addition, tedious manual work and human exposure to nickel oxide-containing powders is reduced.

A further aspect of the present invention is directed towards a set-up of devices, hereinafter also referred to as inventive set-up, wherein said set-up comprises a robot with a device for taking samples 10 mg to 10 g of electrode active material, a means for transferring said samples to another robot or to another part of the same robot, where the robot makes an electrode material mix from samples, and a means for transferring the electrode material mix to a test unit to perform electrochemical tests. Examples of robots are synthesis robots.

In a preferred embodiment of the present invention, the inventive set-up further comprises a processing device that performs the documentation of steps (e) to (g) of the inventive process and that compares the results of electrochemical tests to the desired results.

In a preferred embodiment of the present invention, the inventive set-up further comprises a processing device that collects data as input through an input channel and provides an electronic signal via an output channel to a production control function in case at least two consecutive samples show a negative deviation from the desired results, the term "desired results" being explained above.

The invention is illustrated by the following working example.

I. Providing Precursors 1.1 Synthesis of a Precursor TM-OH.1

A stirred tank reactor was filled with deionized water and tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.9, and a total flow rate resulting in an average residence time of 8 hours. The transition metal solution contained Ni, Co and Mn at a molar ratio of 6:2:2 and a total transition metal concentration of 1.65 mol/kg. The aqueous sodium hydroxide solution was a 25 wt. % sodium hydroxide solution. The pH value was kept at 11.9 by the separate feed of an aqueous sodium hydroxide solution. After stabilization of particle size the resulting suspension was removed continuously from the stirred vessel. The mixed transition metal (TM) oxyhydroxide precursor TM-OH.1 was obtained by filtration of the resulting suspension, washing with distilled water, drying at 120° C. in air and sieving. The average particle diameter (D50) was 10 μm.

1.2 Synthesis of a Precursor TM-OH.2

A stirred tank reactor was filled with deionized water and 49 g of ammonium sulfate per kg of water. The solution was tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.8, and a total flow rate resulting in an average residence time of 8 hours. The transition metal solution contained Ni, Co and Mn at a molar ratio of 8:1:1 and a total transition metal concentration of 1.65 mol/kg. The aqueous sodium hydroxide solution was a 25 wt. % sodium hydroxide solution and 25 wt. % ammonia solution in a weight ratio of 6. The pH value was kept at 12 by the separate feed of an aqueous sodium hydroxide solution. Beginning with the start-up of all feeds, mother liquor was removed continuously. After 33 hours all feed flows were stopped. The mixed transition metal (TM) oxyhydroxide precursor TM-OH.2 was obtained by filtration of the resulting suspension, washing with distilled water, drying at 120° C. in air and sieving. The average particle diameter (D50) was 10 µm.

II. Manufacture of Cathode Active Materials and Quality Control

II.1 Steps (a) to (d)

Step (a.1): CAM-1.1: The mixed transition metal oxyhydroxide precursor TM-OH.1 was mixed with $Al_2O_3$ (average particle diameter 6 nm) and LiOH monohydrate to obtain a mixed powder with a concentration of 0.3 mole-% Al relative to Ni+Co+Mn+Al and a Li/(TM+Al) molar ratio of 1.01.

Step (b.1): The mixture according to step (a.1) was transferred into saggars with a loading of 4 kg. The saggars were ordered in a row of 6 saggars in a line before they entered a roller hearth kiln.

Step (c.1) The saggars from step (b.1) containing the mixture according to step (a.1) were heated to 885° C. in a roller hearth kiln, residence time of 8 hours in the heating zone, in a forced flow of 100% oxygen to obtain the electrode active material CAM-1.1.

Step (d.1): Upon leaving the heating zone, the saggars containing CAM-1.1 were exposed to ambient temperature and allowed to cool down to ambient temperature in an enclosed transfer system purged with dry nitrogen.
The CAM-1.1 is then Deagglomerated with an Air Classifier Mill.

Cam-2.1:

Step (a.2): The mixed transition metal oxyhydroxide precursor obtained TM-OH.2 was mixed with LiOH monohydrate to obtain a concentration to Ni+Co+Mn+Al and a Li/(TM+Al) molar ratio of 1.04.

Step (b.2): The mixture according to step (a.2) was transferred into saggars with a loading of 4 kg. The saggars were ordered in a row of 6 saggars in a line before they entered a roller hearth kiln.

Step (c.2) The saggars from step (b.2) containing the mixture according to step (a.2) were heated to 815° C. in said roller hearth kiln, residence time of 8 hours in the heating zone, in a forced flow of 100% oxygen to obtain the electrode active material CAM-2.1.

Step (d.2): Upon leaving the heating zone, the saggars containing CAM-2.1 were exposed to ambient temperature and allowed to cool down to ambient temperature in an enclosed transfer system purged with dry nitrogen.

TABLE 1

Results from analytical measurements:

|  | CAM-1.1 | CAM-2.1 |
|---|---|---|
| Moisture/ppm | 764 | 540 |
| Surface area/m$^2$/g | 0.26 | 0.32 |
| Tap density (g/cm$^3$) | 2.54 | 2.54 |
| Particle size | | |
| D10 | 6.1 | 7.9 |
| D50 | 10.6 | 11.1 |
| D90 | 18.5 | 15.5 |
| ICP | | |
| Li | 7.38 | 7.21 |
| Co | 12.19 | 6.30 |
| Ni | 36.15 | 48.99 |
| Mn | 11.30 | 5.34 |
| Li residual | | |
| LiOH | 0.158 | 0.626 |
| Li$_2$CO$_3$ | 0.206 | 0.393 |

Steps (e) to (g) are performed with the help of a robot that is connected to a processing device in form of a computer that performs the entire documentation of steps (e) to (g).

Step (e.1)

After step (d.1), respectively, a robotic arm takes several small samples of 1 g CAM-1.1 each from one of the saggars from every 4th row of saggars for further analytics. For this propose, the samples are portioned by a robotic arm in vessels and another robotic arm closes the cap of the vessel to avoid moisture uptake. The closed vessels are then transferred to different sections to carry out the analytics and electrode processing.

Step (f.1)

In one vessel of 1 g of CAM-1.1 is transferred to an automated XRD device to measure the powder pattern of the sample. Another portion of 1 g sample of CAM-1.1 is transferred to an automated Karl-Fischer titration device to measure the moisture content of CAM-1.1 material and another 5 g CAM-1.1 were used for the automated BET surface measurement.

Step (g.1): For the electrode preparation, a robotic arm removes the cap of a vessel and injects a mixture of carbon black and binder dissolved in NMP to CAM-1.1 (further details of slurry composition described in section II.1). The resultant mixture is stirred with a high shear mixer and then casted on an aluminum foil, thickness of 20 µm, with an automated doctor blade system. The coated aluminum foil was transferred to a drying chamber to obtain the resultant electrode foils for the coin-type cell testing. A robotic arm equipped with a punching dye with a diameter of 14 mm punches several discs from the foil to receive the final electrode shape for the coin-type cell. The electrode discs are then transferred to a pressure device to compress the electrode disk to an electrode density of 3.0 g/cm$^3$. The compressed electrodes are transferred to a holder equipped with the one part of a 2032 case, the housing of a coin cell. The compressed electrode disc is placed in the cell case placed by a robotic arm and the separator and anode are stacked over the electrode disc. In the last step, through a pipette the robotic arm adds 50 µL electrolyte to the stacked electrode separator combination in the coin-type cell so obtained. The robot then closes the coin-type cell, and then it moves the coin-type cell for the coin-type cell testing.

Steps (e.2) to (g.2) are performed analogously but with CAM-2.1 instead of CAM-1.1.

III. Electrochemical Cells

III.1. Manufacture of Electrodes for Electrochemical Testing

The positive electrodes for the electrochemical cycling experiments in coin cells were prepared by coating the respective cathode active material on aluminum foil (thickness=20 μm) using an automated doctor knife coating system with subsequent drying (Mathis, KTF-S) a slurry containing 94 wt. % cathode active material (94 wt. %), 1 wt. % active carbon (Super C65 L purchased form Imerys), 2 wt. % graphite (SFG6L from Imerys) and 3 wt. % polyvinylidene fluoride (PVdF) binders suspended in N-methyl-2-pyrrolidinone (NMP). Typically, all the slurries were prepared based on at least 30 g of cathode active material and the amount of NMP employed was such that the total solid content (CAM+SuperC65 L+SFG6L+PVdF) was ca. 65%. Before the cell assembly, the electrode tapes were dried in a hot-air chamber at 120° C. over a period of 16 hours and finally pressed using a roll calender.

III.2. Electrochemical Testing in Half-Cells

Electrochemical testing of cathode active materials (CAM-1.1, CAM-2.1) were carried out in coin half cells (vs. Li metal as anode material to a upper cut-off voltage of 4.3V vs. Li/Li$^+$, 1M LiPF$_6$ in EC:EMC wt % as electrolyte (EC=ethylene carbonate, EMC=ethyl methyl carbonate), GF/D glass fiber separator (Whatman), and CR2032 from Hohsen Corp.) to obtain the specific capacities of the materials.

TABLE 2

Results obtained from electrochemical cells of cathode active materials vs. Li metal anode

| | 1$^{st}$ charge capacities at 25° C. at 0.1 C/mAh/g | 1$^{st}$ discharge capacity at 25° C. at 0.1 C/mAh/g | 1$^{st}$ cycle efficiency/% |
|---|---|---|---|
| CAM-1.1 | 190.65 | 168.38 | 88.3 |
| CAM-2.1 | 210.98 | 184.63 | 87.6 |

The data from the electrochemical tests are collected as input through an input channel in the processing device in form of a computer. The computer compares first charge capacities and discharge capacities and 1st cycle efficiencies to the target capacities and target efficiencies. Said processing device automatically provides an electronic signal via an output channel to the production control function in case at least two consecutive samples show a negative deviation from the specification of about 1%.

The invention claimed is:

1. A process for making an electrode active material comprising the steps of:
   (a) mixing a composite oxide, (oxy) hydroxide, hydroxide or carbonate of nickel and one or more of cobalt and manganese and, optionally, one or more of Mg, Al and Y or a transition metal chosen from Ti, Zr, Nb, Ta, Fe, Mo, and W, with one or more source of lithium chosen from lithium carbonate, lithium oxide and lithium hydroxide and, optionally, with one or more dopant chosen from oxides, hydroxides and oxyhydroxides of Mg, Al, Y, Ti, Zr, Nb, Ta, Fe, Mo, and W, and from fluorides,
   (b) transferring the mixture into saggars, crucibles or open cups,
   (c) calcining the mixture in a pusher kiln, roller hearth kiln, or in a rotary kiln at a temperature ranging from 700° C. to 1000° C.,
   (d) cooling down the resultant electrode active material,
   (e) applying a robot to take two or more samples of 10 mg to 10 g per saggar, crucible, or open cup to be analyzed, or per defined period of time, respectively,
   (f) transferring the samples to another robot or to another part of the same robot, wherein the respective robot makes an electrode material mix from electrode material samples of the same saggar, crucible, or open cup, and
   (g) transferring the electrode material mix to a test unit to perform electrochemical tests, wherein the robot performs steps (f) to (g) with several samples in parallel.

2. The process according to claim 1 wherein step (d) is performed to a maximum temperature of 150° C.

3. The process according to claim 1, wherein step (f) comprises mixing the electrode active material with conductive carbon, a binder polymer, and NMP.

4. The process according to claim 1, wherein step (f) is performed in a forming die with a plurality of recesses arranged in rows, or in wells of a microtiter plate.

5. The process according to claim 1, wherein the transfer in step (g) is made with the help of an electronic pipette or an overhead gravimetric dispersing unit.

6. The process according to claim 1, wherein in step (e), samples are taken from one out of every 5 to 12 saggars, crucible, or open cup per production run.

7. The process according to claim 1, wherein step (g) further comprises the sub-steps of:
   (g1) placing each electrode material mix on a current collector,
   (g2) removing any volatile material from the electrode material mix on the current collectors, thereby obtaining cathodes,
   (g3) attaching the obtained cathodes to separators that are each combined with an anode and with an electrolyte, thereby obtaining coin-type cells, and
   (g4) performing electrochemical tests with the coin-type cells from (g3).

8. The process according to claim 1, wherein an entire documentation of steps (e) to (g) is performed by a processing device, and the results of electrochemical tests are compared to desired results by a processing device.

9. The process according to claim 8, wherein the processing device collects data as input through an input channel and provides an electronic signal via an output channel to a production control function, wherein two or more consecutive samples show a negative deviation from desired results.

* * * * *